(12) United States Patent
Ozaki et al.

(10) Patent No.: US 10,839,739 B2
(45) Date of Patent: Nov. 17, 2020

(54) IMAGE PROCESSING DEVICE, IMAGE PROCESSING METHOD AND DISPLAY SYSTEM

(71) Applicant: Japan Display Inc., Minato-ku (JP)

(72) Inventors: Tadafumi Ozaki, Minato-ku (JP); Yuta Haga, Minato-ku (JP); Tsutomu Harada, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 180 days.

(21) Appl. No.: 16/008,548

(22) Filed: Jun. 14, 2018

(65) Prior Publication Data

US 2019/0005869 A1 Jan. 3, 2019

(30) Foreign Application Priority Data

Jun. 29, 2017 (JP) ................................. 2017-127134

(51) Int. Cl.
| | |
|---|---|
| *G09G 3/22* | (2006.01) |
| *G09G 3/20* | (2006.01) |
| *G06T 5/00* | (2006.01) |
| *G06T 5/20* | (2006.01) |
| *G09G 3/36* | (2006.01) |

(52) U.S. Cl.
CPC ............... *G09G 3/22* (2013.01); *G06T 5/002* (2013.01); *G06T 5/20* (2013.01); *G09G 3/2003* (2013.01); *G09G 3/2044* (2013.01); *G09G 3/2059* (2013.01); *G09G 3/3607* (2013.01); *G09G 2300/0452* (2013.01); *G09G 2310/0264* (2013.01)

(58) Field of Classification Search
CPC ................. G09G 3/22; G09G 3/2003; G09G 2300/0452; G09G 3/2059; G09G 3/3607; G09G 3/2044; G09G 2310/0264; G06T 5/20; G06T 5/002
See application file for complete search history.

(56) References Cited

U.S. PATENT DOCUMENTS

| | | |
|---|---|---|
| 6,671,068 B1 | 12/2003 | Chang et al. |
| 9,019,293 B2 | 4/2015 | Tsuzaki et al. |
| 2005/0073470 A1* | 4/2005 | Nose ....................... G06F 3/147 345/1.1 |
| 2006/0152441 A1* | 7/2006 | Baek .................... G09G 3/2022 345/60 |
| 2010/0098347 A1* | 4/2010 | Tsukamoto ............. G06T 5/009 382/260 |

(Continued)

FOREIGN PATENT DOCUMENTS

| | | |
|---|---|---|
| JP | 10-155087 | 6/1998 |
| JP | 2001-136388 | 5/2001 |

(Continued)

*Primary Examiner* — Lunyi Lao
*Assistant Examiner* — Jarurat Suteerawongsa
(74) *Attorney, Agent, or Firm* — Oblon, McClelland, Maier & Neustadt, L.L.P.

(57) ABSTRACT

An image processing device includes a noise output circuit outputting noise data having an adjusted noise amplitude according to a gradation of input data, a data synthesis circuit synthesizing noise data output from the noise output circuit and the input data, and an error diffusion process circuit configured to perform an error diffusion process on data synthesized and obtained from the data synthesis circuit.

32 Claims, 14 Drawing Sheets

(56) References Cited

U.S. PATENT DOCUMENTS

2013/0222439 A1    8/2013  Higashi et al.
2015/0154905 A1*   6/2015  Takanohashi ........ G09G 3/3275
                                                      345/207

FOREIGN PATENT DOCUMENTS

| JP | 2004-166093 | 6/2004 |
| JP | 2012-145821 | 8/2012 |
| JP | 2013-174760 | 9/2013 |

* cited by examiner

IMAGE PROCESSING DEVICE, IMAGE PROCESSING METHOD AND DISPLAY SYSTEM

CROSS REFERENCE TO RELATED APPLICATIONS

This application is based upon and claims the benefit of priority from the prior Japanese Patent Application No. 2017-127134, filed on Jun. 29, 2017, the entire contents of which are incorporated herein by reference.

FIELD

The present invention is related to an image processing device, an image processing method of the image processing device and a display system for performing these.

BACKGROUND

An electronic signboard which transmits information using a display device such as a display is called a signage or a digital signage. Signage or digital signage is spreading outdoors and indoors without distinction. For example, a signage or a digital signage is arranged in public places such as streets, public institutions such as train stations, airports and hospitals, or in shops and shopping malls, small shops and hotels and the like. In recent years, together with the spread of networks and short-range wireless communication, people traveling in towns and users of facilities are provided with more information including not only still images but also moving images by signage.

In the case when the gradation display capability of pixels in the display area of a display device is low, in other words, when the number of gradations of the pixels is small, lines such as a contour occur in the gradation part of the image and image quality deteriorates. In such cases, it is known that image quality is improved by using an error diffusion method.

For example, a display device using an error diffusion method for reducing the discontinuity of gradation and reducing deterioration of image quality has been developed.

SUMMARY

An image processing device includes a noise output circuit outputting noise data having an adjusted noise amplitude according to a gradation of input data, a data synthesis circuit synthesizing noise data output from the noise output circuit and the input data, and an error diffusion process circuit configured to perform an error diffusion process on data synthesized and obtained from the data synthesis circuit.

An image processing method including inputting input data, outputting noise data with an adjusted amplitude according to the gradation of input data, synthesizing the output noise data and the input data, and performing error diffusion processing on the obtained synthesized data.

A display system including a display device including pixels arranged in a first direction and a second direction intersecting with the first direction, and the image processing device, wherein gradation of a pixel is controlled based on data error diffusion processed data by the image processing device.

DESCRIPTION OF EMBODIMENTS

Figure 1:
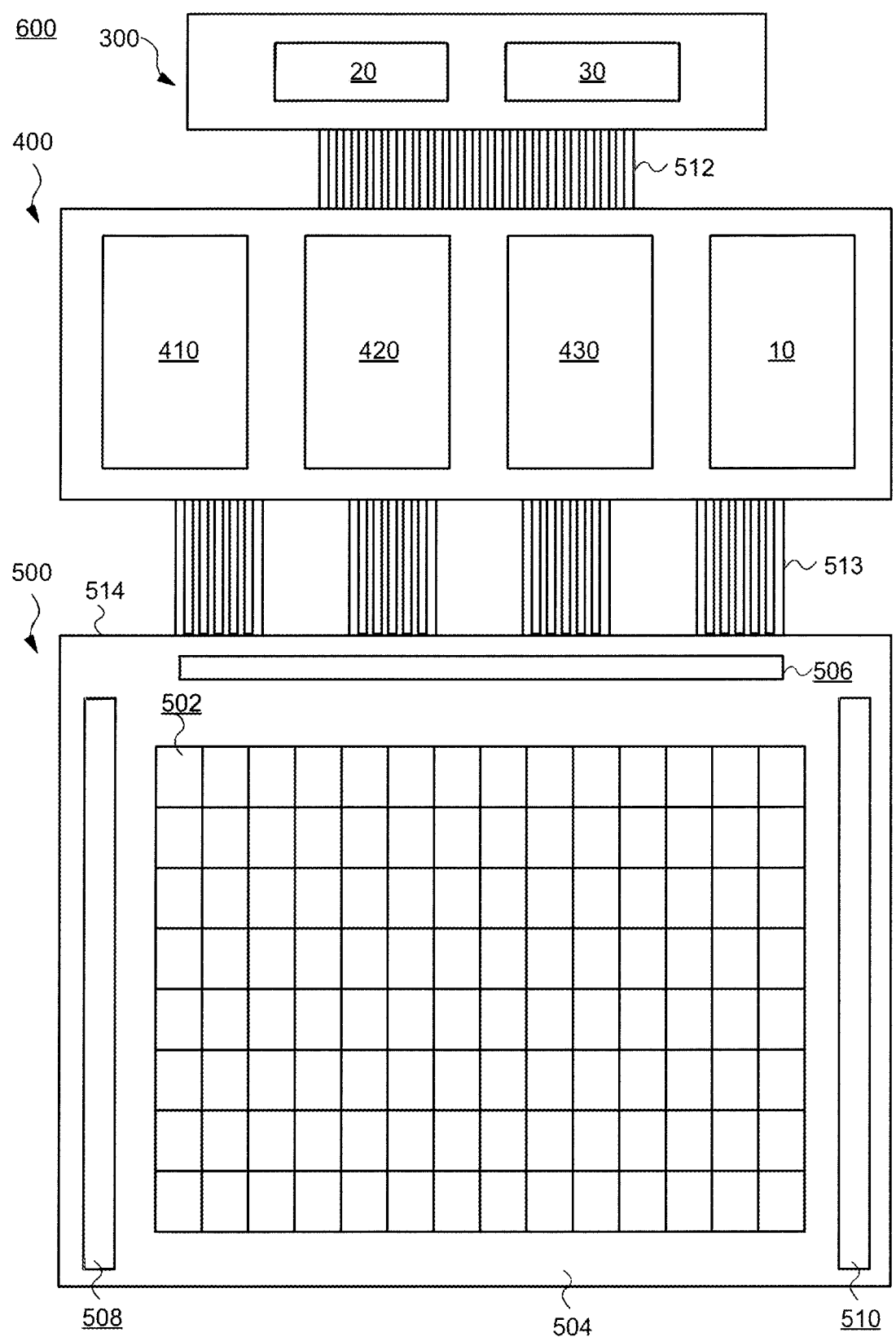
FIG. 1 is a schematic diagram showing a structure of a display system having an image processing device related to one embodiment of the present invention.

Embodiments of the present invention are explained below while referring to the drawings and the like. However, the present invention can be practiced in many different modes and is not to be construed as being limited to the description of the embodiments exemplified below. In addition, in order to make the explanation clearer, the drawings may be schematically represented in terms of the structure of each part in comparison with their actual form, but the drawings are merely examples and do not limit the interpretation of the present invention. Furthermore, in this specification and each drawing, elements similar to those described previously with reference to the preceding figures are denoted by the same reference numerals (or reference numerals followed by a, b, etc.) and a detailed description may be omitted as appropriate. Furthermore, the letters such as [first] and [second] added to each element are convenience signs used for distinguishing the respective elements and do not have any other meaning unless otherwise specified.

First Embodiment

In the present embodiment, a structure of an image processing device and a display system according to an embodiment of the present invention is explained.

FIG. 1 is a schematic diagram showing a structure of a display system 600 according to one embodiment of the present invention.

As is shown in FIG. 1, the display system 600 includes, for example, a circuit substrate 300, a display device module 400 and a display device 500.

The circuit substrate 300 includes at least a power supply circuit 20 and a signal supply circuit 30. Power is supplied to the display device module 400 and the display device 500 via a connector 512 by the power supply circuit 20, and the display device module 400 and the display device 500 are operated with the power. The signal supply circuit 30 supplies an original image that is the source of the image to be displayed on the display device 500 and a signal for driving the display device 500 to the display device module 400 and the display device 500 via the connector 512. A flexible printed circuit (FPC, Flexible Printed Circuit) can be used as the connector 512.

The display device module 400 includes, for example, a DC-DC conversion circuit 410, a system control circuit 420, an RGB image conversion circuit 430 and an image processing device 10.

The DC-DC conversion circuit 410 generates a power supply voltage for driving the system control circuit 420, the RGB image conversion circuit 430, the image processing device 10 and the display device 500 from the power supply supplied from the circuit substrate 300. The generated power supply voltage is supplied to the system control circuit 420, the RGB image conversion circuit 430, the image processing device 10 and the display device 500 whereby each circuit, module, and device can be operated.

The system control circuit 420 can control the DC-DC conversion circuit 410, the RGB image conversion circuit 430, the image processing device 10 and the display device 500 using the original image that is the source of the image to be displayed on the display device 500 supplied from the signal supply circuit 30 and a signal for driving the display device. In addition, the system control circuit 420 may also generate a signal for controlling the RGB image conversion circuit 430, the image processing device 10 and the display device 500 from the original image which is the source of the image to be displayed on the display device 500 supplied from the signal supply circuit 30 and a signal for driving the display device 500. Specifically, the system control circuit 420 may also include a microcontroller unit (MCU) and a memory circuit. The microcontroller unit reads out a program stored in the memory circuit and can generate a signal for controlling the RGB image conversion circuit 430, the image processing device 10 and the display device 500 from the original image of the image to be displayed on the display device 500 and a signal for driving the display device 500 in accordance with the program which is read out. In addition, the microcontroller unit reads out a program stored in the memory circuit and can supply the original image of the image to be displayed on the display device 500 and a signal for driving the display device 500 to the RGB image conversion circuit 430, the image processing device 10 and the display device 500 in accordance with the program which is read out. With such a structure, the system control circuit 420 can manage the DC-DC conversion circuit 410, the RGB image conversion circuit 430, the image processing device 10 and the display device 500.

The RGB image conversion circuit 430 processes an original image which is the source of the image to be displayed on a display device 500 supplied from the signal supply circuit 30 according to a signal for driving the display device 500 supplied from the signal supply circuit 30 and/or a signal generated by the system control circuit 420. For example, the RGB image conversion circuit 430 processes the original image and converts the original image into an image data including color information. The image data including the color information is subjected to error diffusion processing by the image processing device 10. In addition, an image data subjected to error diffusion processing is supplied to the display device 500. It is possible to provide a display system which can reduce the deterioration in image quality by supplying the image data subjected to error diffusion processing to the display device 500.

The display device 500 includes a substrate 514, a display region 504, an image signal line drive circuit 506, a scanning signal line drive circuit 508, a scanning signal line drive circuit 510, a connector 512 and a connector 513.

The display region 504, image signal line drive circuit 506, scanning signal line drive circuit 508 and the scanning signal line drive circuit 510 are formed over the substrate 514. The connector 512 is connected to the substrate 514. All of the image signal line drive circuit 506, the scanning signal line drive circuit 508 and the scanning signal line drive circuit 510 may not be formed on the substrate 514. For example, an integrated circuit (IC not shown in the diagram) including a part of the image signal line drive circuit 506, the scanning signal line drive circuit 508 and the scanning signal line drive circuit 510 may be formed on the substrate 514 or on the connector 512. In addition, an integrated circuit (IC not shown in the diagram) including all of the image signal line drive circuit 506, the scanning signal line drive circuit 50 and the scanning signal line drive circuit 510 may be formed on the substrate 514 or on the connector 512.

The substrate 514 may be a hard substrate such as a glass substrate or a substrate having flexibility. A hard base material such as a glass substrate may include materials exemplified for a glass substrate, a quartz substrate and a ceramic substrate. It is possible to provide the display device 500 with high rigidity by using a hard substrate such as a glass substrate for the substrate 514. The flexible substrate may include, for example, a material selected from polymer materials exemplified by polyimide, polyamide, polyester and polycarbonate. It is possible to provide a light and thin display device 500 by using a flexible base material for the substrate 514.

The display region 504 includes a plurality of pixels 502. The plurality of pixels 502 are arranged along a first direction and a second direction intersecting the first direction. The number of the plurality of pixels 502 may be arbitrarily set. For example, m pixels 502 are arranged in the X direction and n pixels 502 in the Y direction. The number of m and n are each independently a natural number larger than 1. The display region 504 includes a region in which the pixels 502 are arranged in a first direction and a second direction intersecting the first direction. Each of the pixels 502 has a display element. The display element includes, for example, a liquid crystal element and an organic EL element.

In the pixel 502, for example, it is possible to arrange display elements corresponding to the three primary colors of red (R), green (G), and blue (B) for each of the three pixels. Full color display device can be provided by supplying 256 levels of voltage or current to each pixel. In the pixel 502, display elements corresponding to four colors of red (R), green (G), blue (B), and white (W) may be provided for each of the four pixels. Here, although a case is shown in which the pixel 502 has the display elements of the three primary colors and the four colors, the present invention is not limited to this example. Furthermore, the arrangement of the plurality of pixels 502 is also not limited. For example, a stripe arrangement or a delta arrangement may be adopted.

Figure 2:
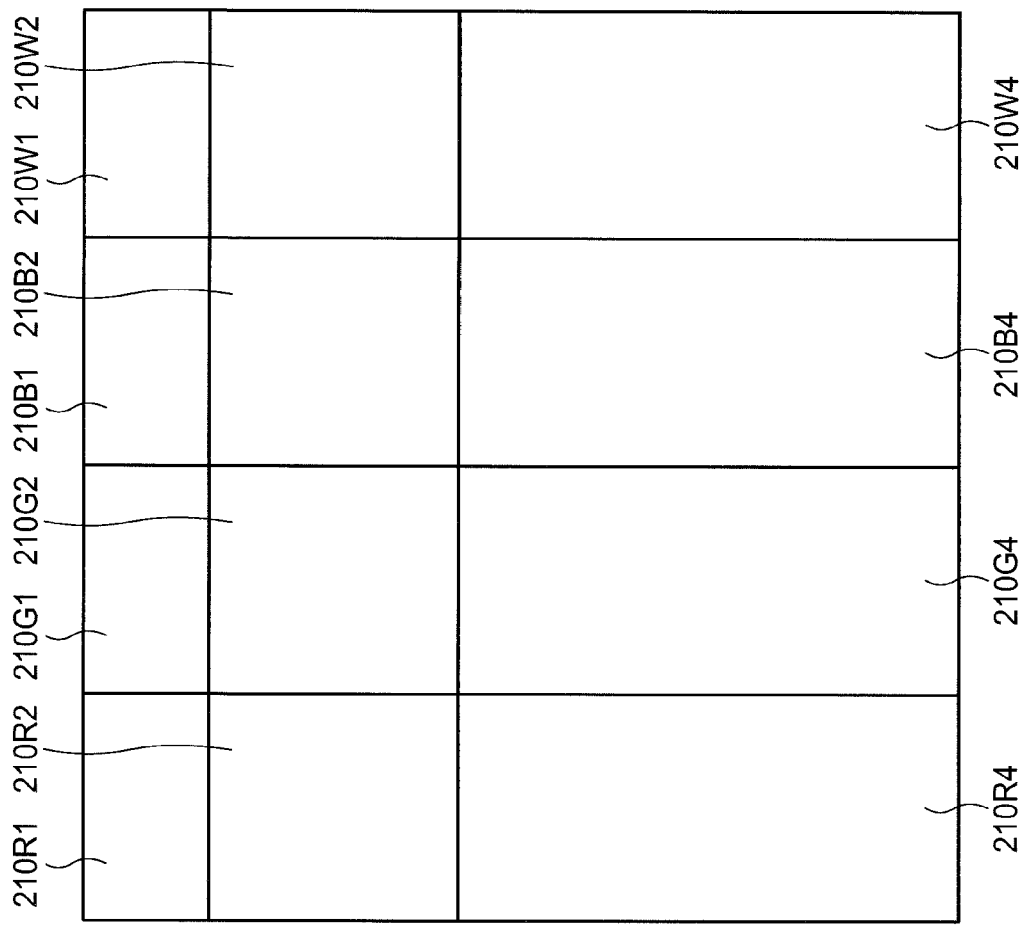
FIG. 2 is a diagram showing an image in a display system related to one embodiment of the present invention.
Figure 3:
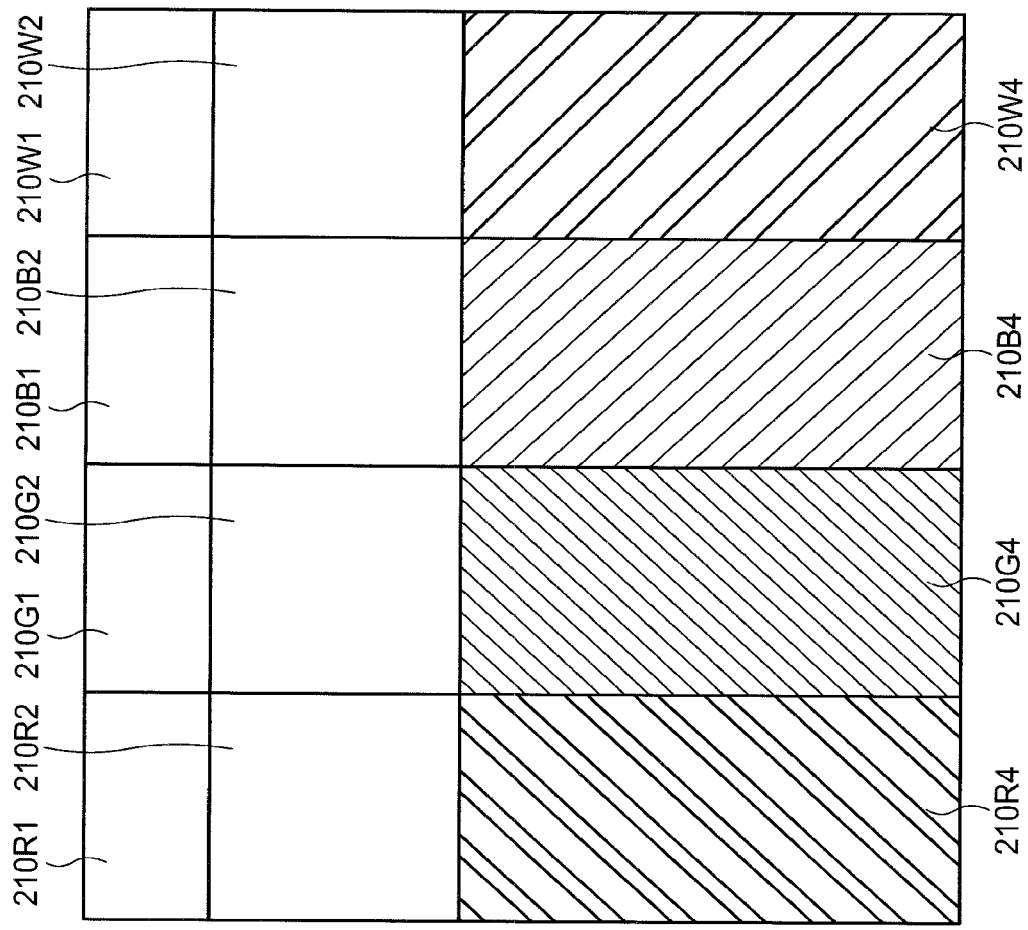
FIG. 3 is a diagram showing an image in a display system related to one embodiment of the present invention.
Figure 4:
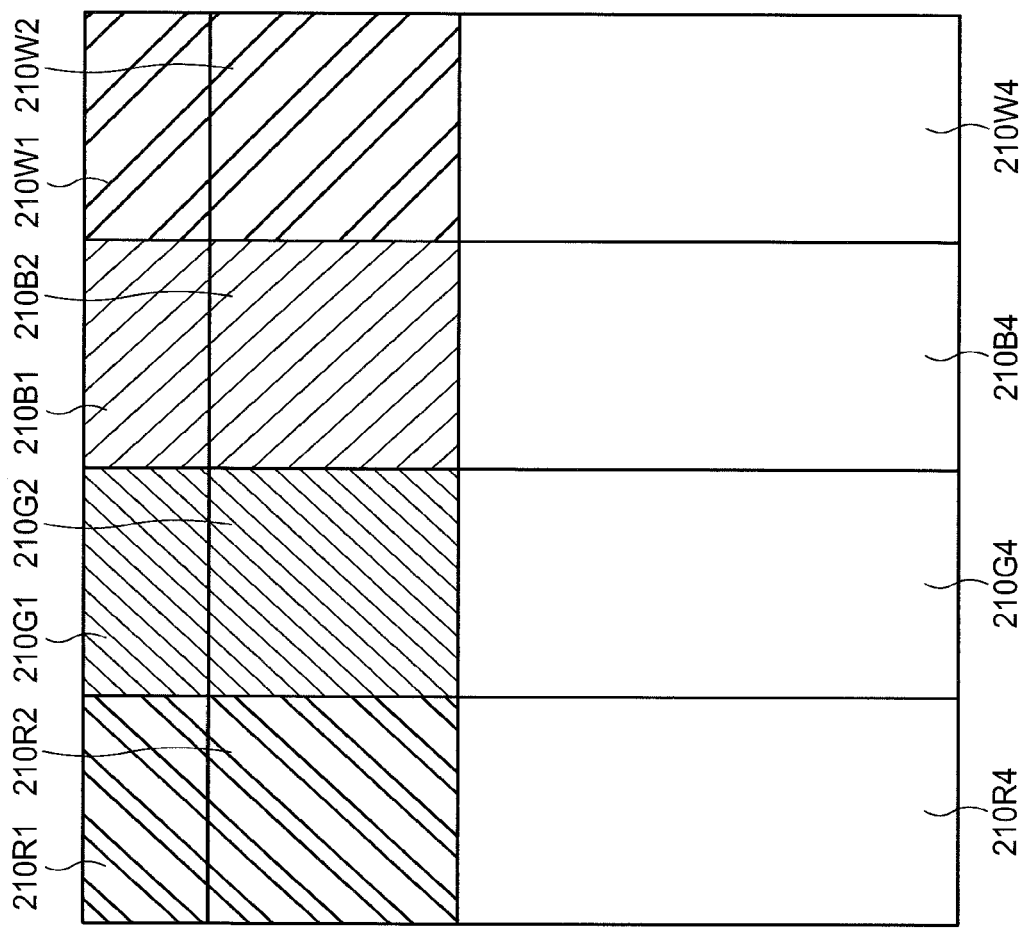
FIG. 4 is a diagram showing an image in a display system related to one embodiment of the present invention.

FIG. 2, FIG. 3, and FIG. 4 are schematic diagrams showing examples of pixels included in a display system according to one embodiment of the present invention. In the examples shown in FIG. 2, FIG. 3, and FIG. 4, one pixel has a plurality of subpixels having different areas, and the gradation of pixels is controlled by a plurality of subpixels.

In the example shown in FIG. 2, an example is shown in which one pixel has three subpixels and can display eight gradations. Pixels which show red 1 gradation of red color are represented by 210R1, pixels which show 2 gradations of red color are represented by 210R2, and pixels which showing 4 gradations of red color are represented by 210R4. When data is not supplied to all of the red pixels 210R1, 210R2 and 210R4, the gradation of red color has a gradation of 0. When data is supplied to a pixel 210R1 showing 1 gradation of red color, the gradation 1 is obtained. When data is supplied to a pixel 210R2 showing 2 gradations of red color, the gradation 2 is obtained. When data is supplied to a pixel 210R1 showing 1 gradation of red color and a pixel 210R2 showing 2 gradations of red color, the gradation 3 is obtained. When data is supplied to the pixel 210R4 showing 4 gradations of red color, the gradation 4 is obtained. When data is supplied to the pixel 210R1 showing a gradation 1 of red color and the pixel 210R4 showing 4 gradations of red color, the gradation 5 is obtained. When data is supplied to the pixel 210R2 showing 2 gradations of red color and the pixel 210R4 showing 4 gradations of red color, the gradation 6 is obtained. When data is supplied to the pixel 210R1 showing 1 gradation of red color and the pixel 210R2 showing 2 gradations of red color, and the pixel 210R4 showing 4 gradations of red color, the gradation 7 is obtained. Therefore, one pixel can display eight levels using 3 subpixels, that is, a display of 8 gradations. A pixel showing a gradation 1 of green color is represented by 210G1, a pixel showing a gradation 2 of green color is represented by 210G2 and a pixel showing a gradation 4 of green color is represented by 210G4. A pixel showing a gradation 1 of blue color is represented by 210B1, a pixel showing a gradation 2 of blue color is represented by 210B2 and a pixel showing a gradation 4 of blue color is represented by 210B4. A pixel showing a gradation 1 of white color is represented by 210W1, a pixel showing a gradation 2 of white color is represented by 210W2 and a pixel showing gradation 4 of white color is represented by 210W4. The display of the gradations of green, blue, and white color is the same as that of red color and an explanation thereof is omitted.

For example, FIG. 3 shows an example in which data is supplied to four subpixels, a pixel 210R4 showing a gradation 4 of red color, a pixel 210G4 showing a gradation of green color, a pixel 210B4 showing a gradation 4 of blue color and a pixel 210W4 showing a gradation 4 of white color. The remaining eight subpixels are supplied with a potential corresponding to a light shielding voltage. In addition, FIG. 4 shows an example in which data is supplied to 8 subpixels, a pixel 210R1 showing a gradation 1 of red color, a pixel 210R2 showing a gradation 2 of red color, a pixel 210G1 showing a gradation 1 of green color, a pixel 210G2 showing a gradation 2 of green color, a pixel 210B1 showing a gradation 1 of blue color, a pixel 210B2 showing a gradation 2 of blue color, a pixel 210W1 showing a gradation 1 of white color and a pixel 210W2 showing a gradation 2 of white color. The remaining four subpixels are supplied with a potential corresponding to the voltage to be shielded. Furthermore, by using subpixels having different areas in this way, it is possible to display an image representing gradations.

Furthermore, a pixel may be a so-called MIP (Memory In Pixel) having a storage function. By a pixel having a storage function, it is possible to store image data for a long time. In addition, by a pixel having a storage function, it is possible to reduce power consumption of the display device or the display system compared with the case where pixels do not have a storage function. In particular, in a display device having reflection type pixels, by using MIP as a pixel, it is possible to further reduce power consumption compared with the case where MIP is not used for pixels.

A case where a pixel 502 has three subpixels with different areas and can display 8 gradations as is shown in FIG. 2 is explained below as an example.

The connector 512 includes a function for supplying an image signal, a timing signal for controlling the operation of the circuit, and a power supply to the image signal line drive circuit 506, the scanning signal line drive circuit 508, and the scanning signal line drive circuit 510. In the present embodiment, an image signal is image data subjected to error diffusion processing in the image processing device 10. The timing signal for controlling the operation of the circuit is a signal for driving the display device 500 supplied from the circuit substrate 300 and a signal for controlling the display device 500 generated in the system control circuit 420. The power supply is a power supply voltage generated by the DC-DC conversion circuit 410. The power supply may be directly supplied from the power supply circuit 20 included in the circuit substrate 300.

The image signal line drive circuit 506, the scanning signal line drive circuit 508, and the scanning signal line drive circuit 510 drive each pixel 502 using the supplied image signal, the timing signal for controlling the operation of the circuit and the power supply and has a role for displaying an image in the display area 504.

Figure 5:
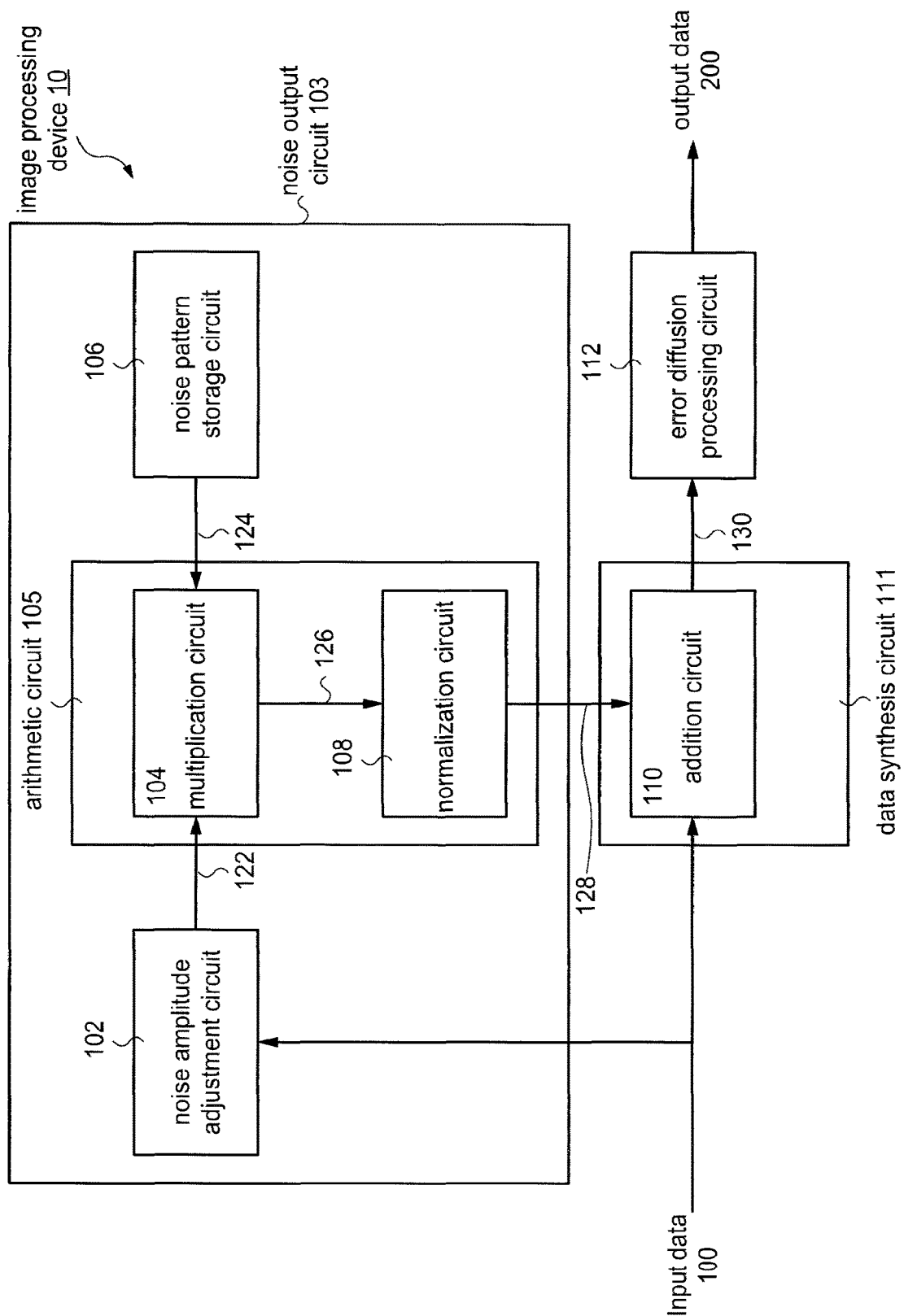
FIG. 5 is a schematic diagram showing an image processing device related to one embodiment of the present invention.

FIG. 5 is a schematic diagram showing an image processing device according to one embodiment of the present invention. As is shown in FIG. 5, the image processing device 10 includes a noise output circuit 103, a data synthesis circuit 111 and an error diffusion processing circuit 112. The noise output circuit 103 includes a noise amplitude adjustment circuit 102, an arithmetic circuit 105, and a noise pattern storage circuit 106. The arithmetic circuit 105 includes a multiplication circuit 104 and a normalization circuit 108. The data synthesis circuit 111 includes an addition circuit 110. The noise amplitude adjustment circuit 102 is electrically connected to the multiplication circuit 104. The noise pattern storage circuit 106 is electrically connected to the multiplication circuit 104. The multiplication circuit 104 is electrically connected to the normalization circuit 108. The normalization circuit 108 is electrically connected to the addition circuit 110. The addition circuit 110 is electrically connected to the error diffusion processing circuit 112.

Input data 100 is input to the image processing device 10 and output data 200 is output. The input data 100 is image data including the color information described above. That is, an original image is converted into image data including color information by the RGB image conversion circuit 430. Here, the original image is the source of the image to be displayed on the display device 500. In addition, the original image is supplied from the signal supply circuit 30. Image data including color information is data in which the original image includes color information. Furthermore, in the present specification the input data 100 is data indicating an image. In addition, in the present specification the output data 200 is also data indicating an image.

The input data 100 is transferred to the noise amplitude adjustment circuit 102 and the addition circuit 110. The noise amplitude adjustment circuit 102 adjusts the noise amplitude for each gradation of the input data 100 and outputs noise adjustment data 122. Specifically, the noise amplitude adjustment circuit 102 outputs noise data which is assigned for each gradation of the input data 100.

Figure 6:
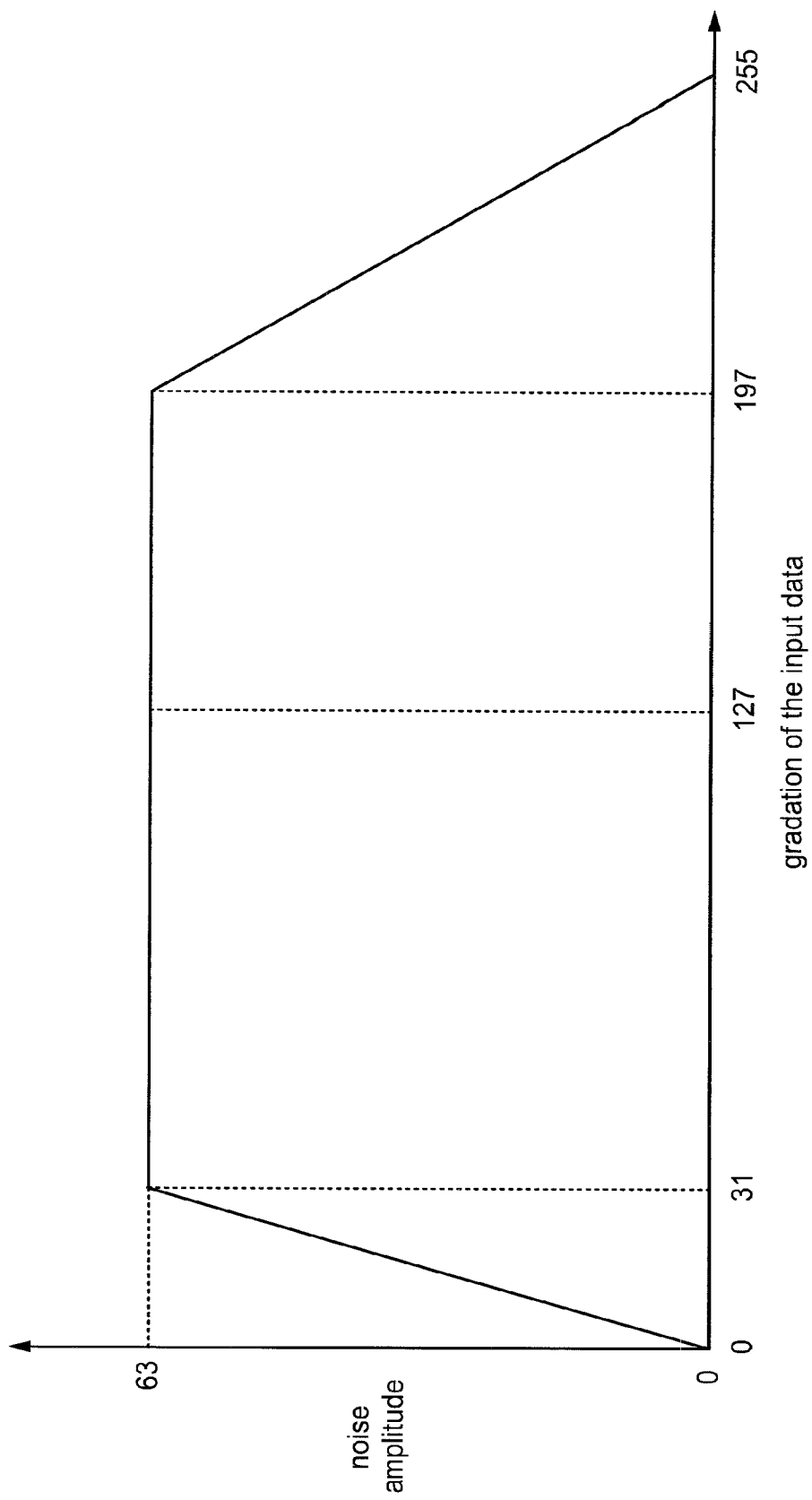
FIG. 6 is a schematic diagram showing a relationship between the gradation of input data and noise amplitude related to one embodiment of the present invention.

FIG. 6 is a schematic diagram showing the relationship between the gradation of input data and the value of noise amplitude data according to one embodiment of the present invention. As is shown in FIG. 6, the noise amplitude adjustment circuit 102 includes a graph in which noise amplitudes are assigned to each gradation of the input data 100. For example, the graph is stored in a memory circuit as a look-up table (LUT). By using the LUT, it is possible to calculate an answer in advance based on the graph and store the answer in the table so that it is possible to omit the calculation each time and perform processes efficiently. The noise amplitude adjustment circuit 102 assigns a noise amplitude to each gradation of the input data 100 and outputs a noise amplitude assigned for each gradation of the input data 100. That is, the noise adjustment data 122 is the noise amplitude assigned to each gradation of the input data 100 by referring to the LUT. In the example shown in FIG. 6, the noise amplitude increases linearly from a gradation 0 to a gradation 31 of the input data 100. When the input data 100 has 31 to 197 gradations, the noise amplitude is 63. When the input data 100 has 197 to 255 gradations, the noise amplitude decreases linearly. In addition, the noise amplitude in the case where the input data 100 has 127 gradations is larger than the noise amplitude in the case where the input data 100 is smaller than 31 gradations. Furthermore, the noise amplitude in the case where the input data 100 has 127 gradations is larger than the noise amplitude in the case where the input data 100 is larger than 197 gradations.

As is described above, the image processing device according to one embodiment of the present invention can adjust noise amplitudes for each gradation of the input data 100 and adjust different noise amplitudes for each gradation of the input data 100. In addition, the image processing device according to one embodiment of the present invention can adjust the noise amplitude for each gradation of the input data 100 and assign different noise amplitudes for each gradation of the input data 100. Therefore, the image processing device according to one embodiment of the present invention can increase a gradation change for each gradation of the input data 100. In particular, by reducing the noise amplitude corresponding to the case where the gradation of the input data 100 is low, it is possible to reduce a change in the luminosity of the image before and after image processing. In addition, by reducing the noise amplitude corresponding to the case where the gradation of the input data 100 is high, it is possible to reduce a change in the luminosity of an image before and after image processing. For example, when the gradation is lower than a predetermined value, the conditions for reducing a change in the luminosity of an image before and after image processing may be such that the noise amplitude is twice or less the gradation of the input data 100. In addition, for example, when the gradation is higher than a predetermined value, the conditions for reducing a change in the luminosity of an image before and after image processing is that the noise amplitude may be a value less than a value subtracted from the gradation 255 to twice the gradation of the input data 100.

Furthermore, the noise amplitude adjustment circuit 102 may have a nonvolatile memory and a LUT may be stored in the nonvolatile memory. The noise amplitude adjustment circuit 102 can store the noise amplitude for each gradation of the input data 100 by including the LUT. Therefore, even with an increase in gradation, it is possible to deal with the rewriting of the contents of the LUT. That is, the noise amplitude adjustment circuit 102 according to one embodiment of the present invention can perform image processing with high accuracy.

Returning to FIG. 2, the noise adjustment data 122 is transmitted to the multiplication circuit 104. The noise pattern storage circuit 106 includes a noise pattern.

Figure 7:
FIG. 7 is a diagram showing a noise pattern related to one embodiment of the present invention.

FIG. 7 is a schematic diagram showing a noise pattern according to one embodiment of the present invention. For example, as is shown in FIG. 7, a noise pattern is a fixed pattern in which 64 levels of noise data are arranged one by one at each coordinate of a matrix of 8 rows and 8 columns. For example, in FIG. 7, it is assumed that the X direction is a row from the first row to the eighth row in the direction of the X arrow. In addition, in FIG. 7, the Y direction is a column from the first row to the eighth row in the direction of the Y arrow. The noise data for the coordinates of a matrix of 3 rows and 6 columns is 59, the noise data for the coordinates of a matrix of 6 rows and 5 columns is 36, and the noise data for the coordinates of a matrix of 1 row and 1 column is 21.

The noise pattern 124 is transferred to the multiplication circuit 104. The multiplication circuit 104 multiplies the noise data of the coordinates of the noise pattern 124 which corresponding to the coordinates of a pixel to which the noise adjustment data 122 corresponds to the noise adjustment data 122, and outputs the noise multiplication data 126. The noise multiplication data 126 is noise data multiplied by noise. For example, in the input data 100 of 8 rows and 8 columns, in the case when the gradations of the input data 100 of 2 rows and 3 columns is 114, the noise adjustment data 122 is the noise amplitude 63 from FIG. 6. From FIG. 7, since noise data for the coordinates of a matrix of 2 rows and 3 columns out of the noise pattern having a matrix of 8 rows and 8 columns is 45, the noise multiplication data 126 with respect to input data 100 of 2 rows and 3 columns is obtained by multiplying 63 by 45 and becomes 2835. By multiplying the noise adjustment data 122 and the noise data of the coordinates of the noise pattern 124 corresponding to the coordinates of the pixel corresponding to the noise adjustment data 122, it is possible to further add random noise for each image data. Therefore, in the display device according to one embodiment of the present invention, the number of dynamic pixels generated by error diffusion processing can be reduced. Therefore, the display device according to one embodiment of the present invention makes it possible to provide high quality images by error diffusion processing. Furthermore, the noise pattern may be a fixed pattern of 2 bits or more. Specifically, the noise pattern may be a 4 bit dither pattern in which 4 levels of noise data are arranged one by one at each coordinate of a matrix of 2 rows and 2 columns, or the noise pattern may be a 6 bit dither pattern in which 6 levels of noise data are arranged one by one at each coordinate of a matrix of 2 rows and 3 columns or 3 rows and 2 columns. Since the noise pattern is a fixed pattern such as a dither pattern, it is possible to use an existing pattern, therefore it is possible to omit the trouble of creating a new noise pattern. In addition, the noise pattern may also be stored in a memory, for example, a nonvolatile memory. Since the display device according to one embodiment of the present invention can be provided with a nonvolatile memory, it is possible to store various noise patterns. Therefore, the display device according to one embodiment of the present invention can read put a noise pattern corresponding to the input data 100 and multiply it with the adjusted data. By providing the display device according to one embodiment of the present invention with a nonvolatile memory, it is possible to provide the device with versatility. In addition, since the display device according to one embodiment of the present invention can be provided with a nonvolatile memory, it is possible to easily rewrite data when it is desired to change the data of the noise pattern.

The noise multiplication data 126 is transferred to the normalization circuit 108. The normalization circuit 108 normalizes the noise multiplication data 126 and outputs the noise output data 128. The noise output data 128 is noise data in which noise is normalized. For example, when the noise multiplication data 126 is noise data among the noise pattern of a matrix of 8 rows and 8 columns, it is possible to divide the noise multiplication data 126 by 64 and normalize the data so that the noise added to the image data is clarified.

The noise output data 128 is transferred to the addition circuit 110. The addition circuit 110 synthesizes the input data 100 and the noise output data 128, and outputs the synthesized data 130. It is possible for noise to be added to each input data 100 by the addition circuit 110. Therefore, it is possible to emphasize the noise of each image data and reduce the number of dynamic pixels generated by subsequent error diffusion processing. Therefore, it is possible to provide high quality images.

The synthesized data 130 is transferred to the error diffusion processing circuit 112. The error diffusion processing circuit 112 performs error diffusion processing on the synthesized data 130 and outputs error diffusion processed data. The data on which error diffusion processing has been performed is output data 200. Here, the error diffusion processing is a well-known technique, and a detailed explanation is omitted. The output data 200 is transferred to the display device 500.

Next, an image processing method of the image processing device 10 shown in FIG. 5 is explained. Furthermore, an explanation of the same structure as the structure described above may be omitted.

Figure 8:
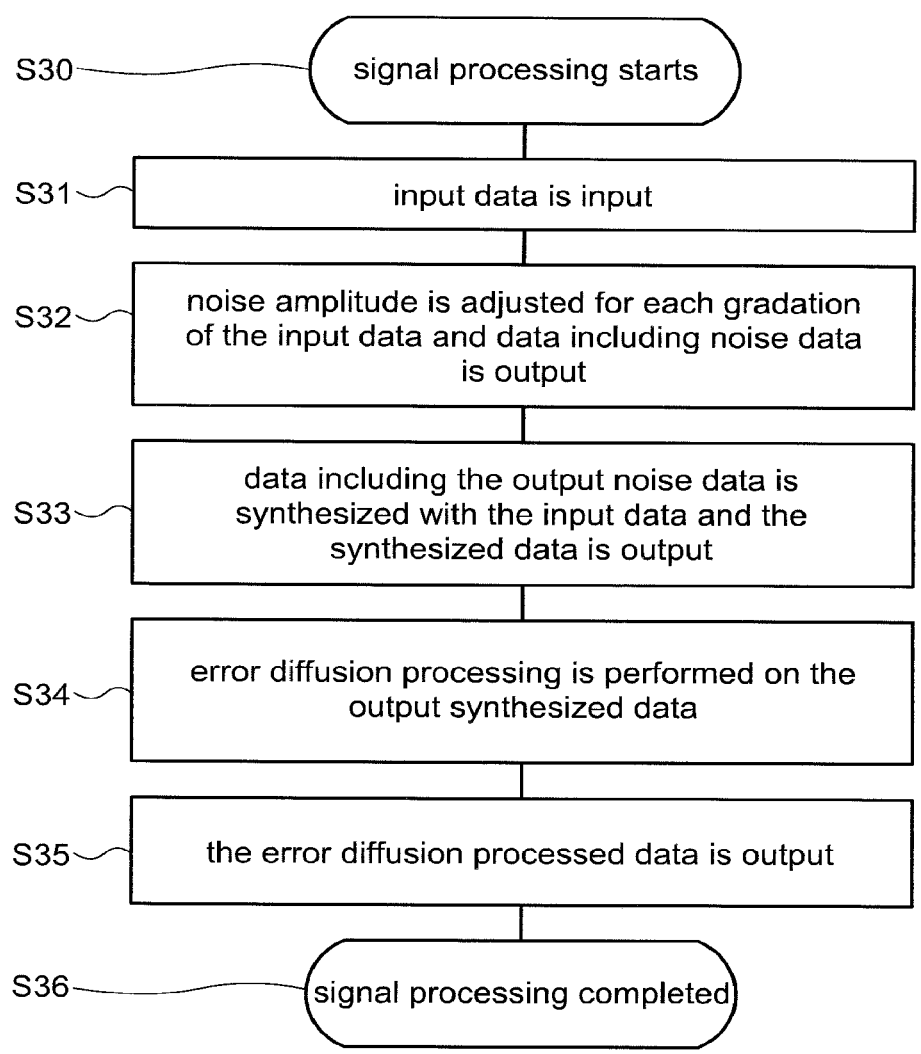
FIG. 8 is a diagram showing a flowchart for explaining an image processing method of an image processing device related to one embodiment of the present invention.

FIG. 8 is a schematic diagram showing a flowchart explaining an image processing method of the image processing device 10 shown in FIG. 5 according to one embodiment of the present invention.

Signal processing of the image processing device 10 starts (step 30 (S30)). The input data 100 is input to the image processing device 10 (step 31 (S31)). The noise amplitude is adjusted for each gradation of the input data 100 and data including noise data is output (step 32 (S32)). The data including the output noise data is the noise output data 128. Next, the data including the output noise data is synthesized with the input data and the synthesized data is output (step 33 (S33)). The data which is output and synthesized is the synthesized data 130. Furthermore, error diffusion processing is performed on the output synthesized data (step 34 (S34)). Next, the error diffusion processed data is output (step 35 (S35)). Here, the output error diffusion processed data is the output data 200 and signal processing of the image processing device 10 is completed (step 36 (S36)).

The output data 200 is supplied to the display device 500. The image signal line drive circuit 506, the scanning signal line drive circuit 508 and the scanning signal line drive circuit 510 included in the display device 500 are supplied with the supplied output data 200, a timing signal for controlling the operation of the circuit, and a power supply and thereby, drive each pixel 502. Next, the display device 500 displays an image in the display region 504. At this time, the method of driving a pixel 502 may be, for example, dot inversion, source line inversion or gate line inversion. In the present embodiment, regardless of which driving method is used, it is possible to reduce deterioration of image quality of an image displayed on the display device and flicker of the image can be reduced.

As described above, in the image processing device, it is possible to reduce dynamic pixels generated by error diffusion by adding noise data having an amplitude which is adjusted to the input data. Therefore, the image processing device according to one embodiment of the present invention can provide high quality images. In addition, in the image processing device according to one embodiment of the present invention, it is possible to adjust the noise amplitude of the input data, in particular, it is possible to suppress the deterioration of images caused by noise addition as seen on the low gradation side and the high gradation side. Therefore, it is possible to provide a display system in which deterioration in image quality of a display device is suppressed by using the image processing device according to one embodiment of the present invention.

As described above, in the image processing device according to one embodiment of the present invention, the image processing method of the image processing device and the display system on which these are mounted is arranged with a noise output circuit which adjusts noise amplitude for each gradation of the input data and outputs data including the noise data. In addition, in the image processing device and the image processing method of the image processing device according to one embodiment of the present invention and the display system on which these are mounted is arranged with a data synthesis circuit which synthesizes noise output data output from a noise output circuit and input data. Furthermore, in the image processing device and the image processing method of the image processing device according to one embodiment of the present invention and the display system on which these are mounted, an error diffusion processing circuit is arranged which performs error diffusion processing on the data synthesized by the data synthesis circuit. By providing such a structure, the image processing device and the image processing method of the image processing device according to one embodiment of the present invention and the display system on which these are mounted can provide a display system which can reduce a drop in image quality. In particular, in the case where the image data is video, since it is possible to reduce the deterioration of image quality at the time of the gradation processing of the video, it is possible to provide a display system in which flickering of the images displayed on the display device does not stand out and high quality display is possible.

Second Embodiment

In the present embodiment, another image processing device according to one embodiment of the present invention is explained. Furthermore, an explanation of the same structure as in the first embodiment may be omitted.

Figure 9:
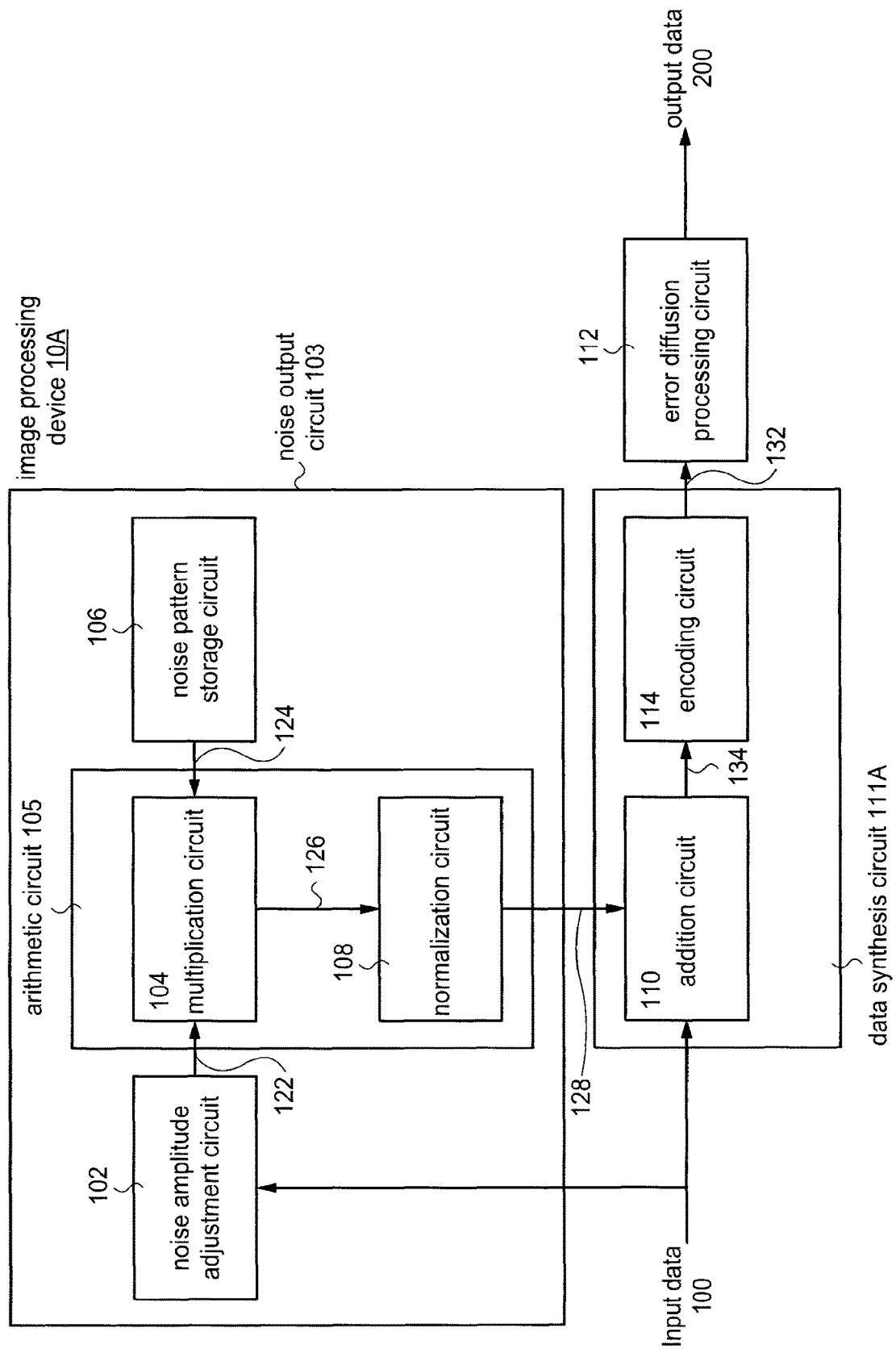
FIG. 9 is a schematic diagram showing another image processing device related to one embodiment of the present invention.

FIG. 9 is a schematic diagram showing an image processing device 10A according to one embodiment of the present invention. The structure of a data synthesis circuit 111 is different from that of the image processing device 10 shown in FIG. 5. Apart from the structure of the data synthesis circuit 111, the image processing device 10A is the same as the image processing device 10 shown in FIG. 2 and an explanation is omitted.

The data synthesis circuit 111A of the image processing device 10A shown in FIG. 9 includes an addition circuit 110 and an encoding circuit 114. The addition circuit 110 is electrically connected to the encoding circuit 114. The encoding circuit 114 is electrically connected to an error diffusion processing circuit 112.

Noise output data 128 is transferred to the addition circuit 110. The addition circuit 110 adds the input data 100 and the noise output data 128 and outputs addition data 134. It is possible to add noise to each input data 100 using the addition circuit 110. Therefore, it is possible for the addition circuit 110 to emphasize the noise of each image data and make subsequent data processing easier.

The addition data 134 is transmitted to the encoding circuit 114. The encoding circuit 114 encodes the addition data 134 and outputs encoded data 132. For example, the lower 2 bits of the 8 bit added data 134 are deleted and 6 bit encoded data 132 is output.

As another example of encoding, data having 256 levels of gradation may be converted into one gradation for every four levels and encoded into data having 64 levels of gradation. Here, the data having 256 levels of gradation is 8 bit data. In addition, data having 64 levels of gradation is 6 bit data. For example, by changing RGB image data in a 4 frame cycle using 2 bit frame rate control (FRC), it is possible to express a gradation equivalent to 8 bits by the output of 6 bit RGB image data. That is, in FRC, the lower 2 bits change every 4 frames so that 6 bits are interpreted as pseudo 8 bits. Therefore, by using the encoding circuit 114 according to one embodiment of the present invention, it is possible to encode 8 bit data into 6 bit data with 2 fewer bits. That is, by using the encoding circuit 114 according to the embodiment of the present invention, it is possible to encode the added data having 256 levels of gradation into data having 64 levels of gradation with 2 fewer bits. Therefore, by using the encoding circuit 114 according to one embodiment of the present invention, it is possible to convert image data which expresses a gradation equivalent to the 8 bits into image data expressing 6 bit gradations in advance. Therefore, by using the encoding circuit 114 according to one embodiment of the present invention, it is possible to suppress frequent changes of image data. In addition, by using the encoding circuit 114 according to one embodiment of the present invention, since it is possible to convert image data expressing gradations equivalent to 8 bits into image data expressing gradations of 6 bits in advance, it is possible to subsequently reduce the load on the error diffusion processing. Furthermore, by using the encoding circuit 114 according to one embodiment of the present invention, it is possible to output the output data 200 in which deterioration of image quality is suppressed in the subsequent error diffusion processing by the error diffusion processing circuit 112. This is particularly effective when the input data 100 is a still image. Furthermore, although FRC is described as an example here, the present invention is not limited to this example. The circuit structure and functions of the display device according to one embodiment of the present invention may be suitably examined without departing from the concept of the present invention.

Next, an image processing method of the image processing device 10A shown in FIG. 9 is explained. Furthermore, an explanation of the same structure as the structure described above may be omitted.

Figure 10:
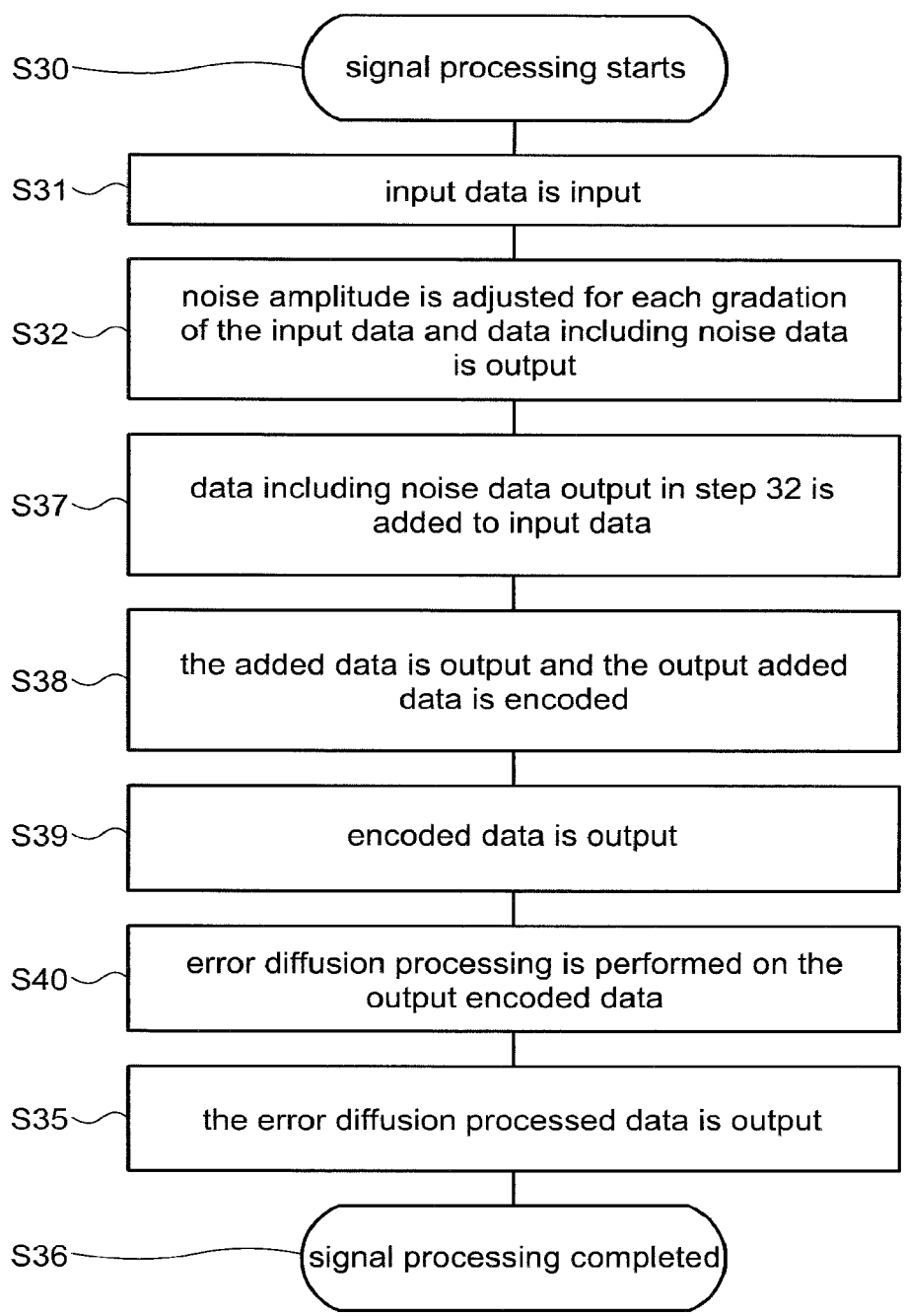
FIG. 10 is a diagram showing a flowchart for explaining an image processing method of an image processing device related to one embodiment of the present invention.

FIG. 10 is a schematic diagram showing a flowchart explaining the image processing method of the image processing device 10A shown in FIG. 9. FIG. 10 is different from the flowchart shown in FIG. 8 in that the steps 37 to 40 are different. Apart from the steps 37 to 40, the flowchart for explaining the image processing method shown in FIG. 8 is the same and therefore an explanation here is omitted. Furthermore, in FIG. 10, the image processing device 10 will be read as the image processing device 10A in the flowchart shown in FIG. 8.

Data including noise data output in step 32 is added to input data (step 37 (S37)). Next, the added data is output and the output added data is encoded (step 38 (S38)). The output added data is addition data 134. Furthermore, the encoded data is output (step 39 (S39)). Next, error diffusion processing is performed on the output encoded data is (step 40 (S40)). The output encoded data is encoded data 132. Furthermore, the error diffusion processed data is output in step 35 and signal processing of the image processing device 10A is completed in step 36. The data subjected to error diffusion processing is output data 200.

Figure 11:
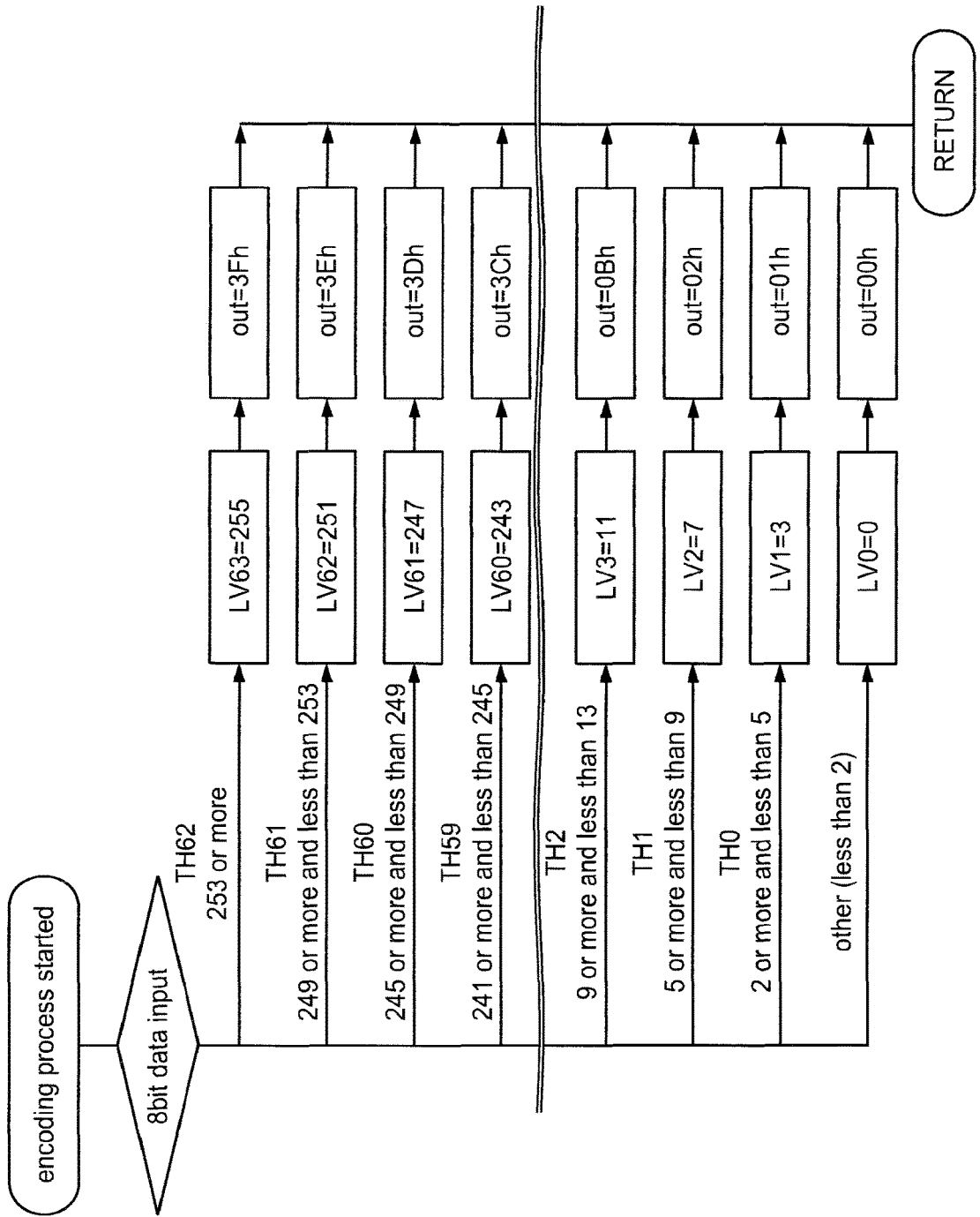
FIG. 11 is a diagram showing a flowchart for explaining a processing method of an encoding circuit included in another image processing device related to one embodiment of the present invention.

FIG. 11 shows a detailed flowchart of encoding. Here, although an example is explained in which added data is 8 bit data and the encoded data is 6 bit data, the present invention is not limited to this example. Furthermore, the 8 bit data is data having 256 levels of gradation. In addition, the 6 bit data is data having 64 levels of gradation obtained by converting 256 levels of gradation into 1 gradation for every 4 levels.

According to FIG. 11, when the encoding process is started, the added data is input one at a time.

In the example of FIG. 11, 8 bit data is divided into ranges for every 4 bits. Specifically, the ranges are [253 or more], [249 or more and less than 253], [245 or more and less than 249], [241 or more and less than 245], [9 or more and less than 13], [5 or more and less than 9], [2 or more and less than 5] and [other (less than 2)]. Next, it is determined to which range the added data belongs. Furthermore, although there are ranges divided into 4 between [241 or more and less than 245] and [9 or more and less than 13], a description between [241 or more and less than 245] and [9 or more and less than 13] in FIG. 11 is not shown. Each range is attached with a number such as TH62, TH61 and TH60. The range may be set more narrowly according to the number of bits of the added data. In addition, the range may be set to be less narrow according to the number of bits of the added data. The display device according to one embodiment of the present invention can obtain even higher definition images as the ranges become more narrowly set.

The encoding circuit 114 for example converts data having a gradation of 256 levels into one gradation for every four levels and calculates data corresponding to data having a gradation of 64 levels. That is, the encoding circuit 114 encodes 8 bit data into 6 bit data based on the determination shown in FIG. 11. The encoding circuit 114 may also calculate data corresponding to data having 64 levels of gradation by combining a plurality of levels instead of a fixed level such as 2 levels, 4 levels or 5 levels. In the example shown in FIG. 11, for example, in the case when data having 256 levels of gradation is [253 or more], the encoding circuit 114 determines that the data corresponding to data having 64 levels of gradation is [255]. Similarly, when data having 256 levels of gradation is [245 or more and less than 249], the encoding circuit 114 determines that the data corresponding to data having 64 levels of gradation is [251]. In the case when the data having 256 levels of gradation is [245 or more and less than 249], data corresponding to data having 64 levels of gradation is determined as [247]. In the case when data having 256 levels of gradation is [241 or more and less than 245], data corresponding to data having 64 levels of gradation is determined as [243]. In the case when the data having 256 levels of gradation is [9 or more and less than 13], data corresponding to data having 64 levels of gradation is determined as [11]. In the case when the data having 256 levels of gradation is [5 or more and less than 9], data corresponding to data having 64 levels of gradation is determined as [7]. In the case when the data having 256 levels of gradation is [2 or more and less than 5], data corresponding to data having 64 levels of gradation is determined as [3]. In the case when the data having 256 levels of gradation is [other (less than 2)], data corresponding to data having 64 levels of gradation is determined as [0].

Data corresponding to data having 64 gradations is determined in this way by converting data having 256 levels of gradation into one gradation for every four levels. Next, data values corresponding to data having 64 levels of gradation is further calculated by the encoding circuit 114. More specifically, in the case when data corresponding to data having 64 levels of gradation is [255], for example, the encoding circuit 114 sets the value of the encoded data to [3Fh]. Similarly, in the case when data corresponding to data having 64 levels of gradation is [251], the value of the encoded data is [3Eh]. In the case when the data corresponding to the data having 64 levels of gradation is [247], the value of the encoded data is [3Dh]. In the case when the data corresponding to the data having 64 levels of gradation is [243], the value of the encoded data is [3Ch]. In the case when the data corresponding to the data having 64 levels of gradation is [11], the value of the encoded data is [0Bh]. In the case when the data corresponding to the data having 64 levels of gradation is [7], the value of the encoded data is [02h]. In the case when the data corresponding to the data having 64 levels of gradation is [3], the value of the encoded data is [01h]. In the case when the data corresponding to data having 64 levels of gradation is [0], the value of the encoded data is [00h].

Furthermore, although an example is shown in the present embodiment in which the encoding circuit encodes image data having 256 levels of gradation into data having 64 levels of gradation which has been converted into one gradation for every four steps, the present embodiment is not limited to this example. That is, although an example is shown in the present embodiment in which the encoding circuit encodes 8 bit data into 6 bit data, the present invention is not limited to this example. Error diffusion processing in the present embodiment often processes 3 bit image data. Therefore, the encoding process by the encoding circuit may be performed between 8 bits and 4 bits.

By adopting such a structure, it is possible to output output data in which the deterioration in image quality is suppressed. Therefore, by adopting such a structure, it is possible to provide an image processing device, an image processing method of the image processing device and a display system in which these are mounted which can provide high quality image data.

Third Embodiment

In the present embodiment, another example of the noise amplitude adjustment circuit 102 included in the image processing device according to one embodiment of the present invention is explained. Furthermore, an explanation of structures which are similar to those of the first embodiment or the second embodiment may be omitted.

Figure 12:
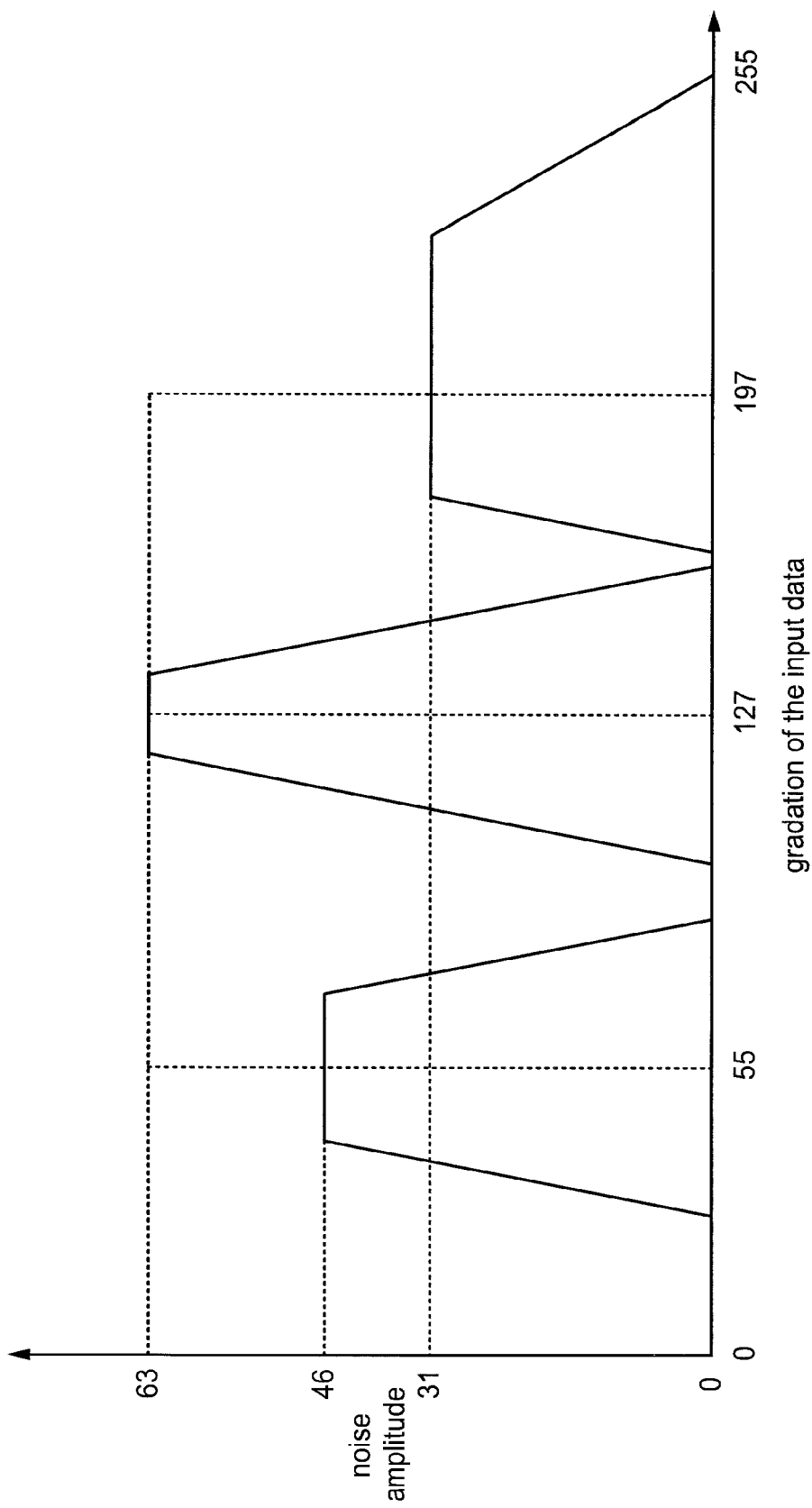
FIG. 12 is a schematic diagram showing another example of a relationship between the gradation of input data and noise amplitude related to one embodiment of the present invention.

FIG. 12 is a schematic diagram of another example showing the relationship between the gradation of input data and noise amplitude according to one embodiment of the present invention. FIG. 12 is different to the schematic diagram showing the relationship between the gradation and noise amplitude of input data shown in FIG. 6 in that three convexes are shown in the graph in FIG. 12. Apart from that described above, FIG. 12 is the same as the schematic view shown in FIG. 6 and an explanation is omitted here.

According to FIG. 5 and FIG. 9, the input data 100 is transmitted to the noise amplitude adjustment circuit 102 and the addition circuit 110. The noise amplitude adjustment circuit 102 adjusts the noise amplitude for each gradation of the input data 100 and outputs the noise adjustment data 122. More specifically, the noise amplitude adjustment circuit 102 outputs the noise amplitude assigned for each gradation of the input data 100. The noise adjustment data 122 is a noise pattern.

As is shown in FIG. 12, the noise amplitude adjustment circuit 102 has data in which noise amplitudes indicating three convexes are assigned to each gradation of the input data 100. For example, in a display device having 16 pixels of 4 rows and 4 columns, it is assumed that each pixel can display gradations of 8 bits. In addition, in such a display device, frames are switched every 0.5 seconds. Under such conditions, it has been confirmed that flickering becomes apparent when an image displayed by the display device changes from 1 gradation to 2 gradations. That is, it has been confirmed that flickering is becomes apparent when image data changes from 16 gradations to 48 gradations. In addition, it has been confirmed that flickering becomes apparent when an image displayed by a display device changes from 3 gradations to 4 gradations That is, it has been confirmed that flickering is apparent when the image data changes from 80 gradations to 112 gradations. Furthermore, it has been confirmed that flickering becomes apparent when an image displayed by a display device changes from 5 gradations to 6 gradations. That is, it has been confirmed that flickering becomes apparent when the image data changes from 176 gradations to 208 gradations. Therefore, when input data in the vicinity of 55 gradations where flickering is apparent are input, and the noise amplitude adjustment circuit 102 is set so that the noise amplitude is increased. Similarly, the noise amplitude adjustment circuit 102 is set so as to increase the noise amplitude also when input data in the vicinity of 127 gradations is input and input data near 197 gradations is input. Specifically, the noise amplitude adjustment circuit 102 outputs a noise amplitude of 46 when input data in the vicinity of 55 gradations where flickering is apparent is input. In addition, the noise amplitude adjustment circuit 102 outputs a noise amplitude of 63 when input data in the vicinity of 127 gradations where flickering is apparent is input. Furthermore, the noise amplitude adjustment circuit 102 outputs a noise amplitude of 31 when input data in the vicinity of 197 gradations where flickering is apparent is input.

Figure 13:
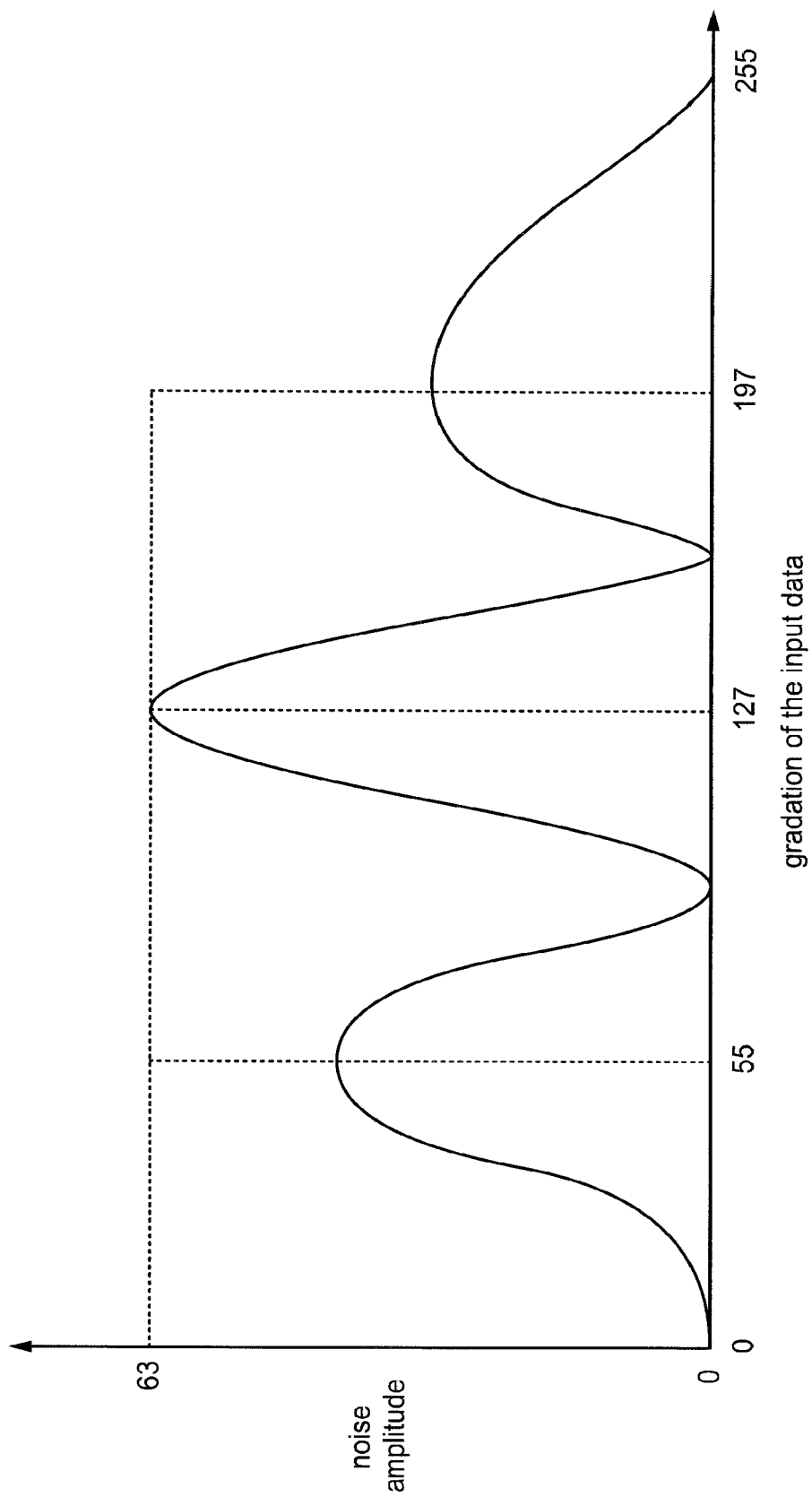
FIG. 13 is a schematic diagram showing another example of a relationship between the gradation of input data and noise amplitude related to one embodiment of the present invention.

FIG. 13 is a schematic diagram of yet another example showing the relationship between the gradation of input data and noise amplitude according to one embodiment of the present invention. FIG. 13 is different from the schematic diagram showing the relationship between the gradation and the noise amplitude of the input data shown in FIG. 6 in that three convexes s are shown in the graph in FIG. 13. Apart from that described above, FIG. 13 is the same as the schematic diagram shown in FIG. 6 and an explanation is omitted here.

As is shown in FIG. 13, the noise amplitude adjustment circuit 102 may include data having a smooth curved and data in which noise amplitudes indicating three peaks are assigned to each gradation of the input data 100. FIG. 13 is similar to FIG. 12 except that it has a smooth curve. Therefore, in FIG. 13, an explanation other than having the smooth curve here is omitted. Here, in the range of gradations of the input data, the noise amplitude with respect to the median value of the gradation of the input data is larger than the noise amplitude with respect to a first gradation. The first gradation is smaller than the median value of the gradation of the input data. In addition, in the range of gradations of the input data, the noise amplitude with respect to the median value of the gradation of the input data is larger than the noise amplitude with respect to a second gradation. The second gradation is larger than the median value of the gradation of the input data. Furthermore, in the range of gradations of the input data, the noise amplitude becomes maximum with respect to the median value of the gradation of the input data. Furthermore, in the range of gradations of the input data, the noise amplitude with respect to the median value of the gradation of the input data, the noise amplitude value with respect to the first gradation of the input data and the noise amplitude with respect to the second gradation of the input data Is greater than the noise amplitude with respect to other gradations of the input data.

Figure 14:
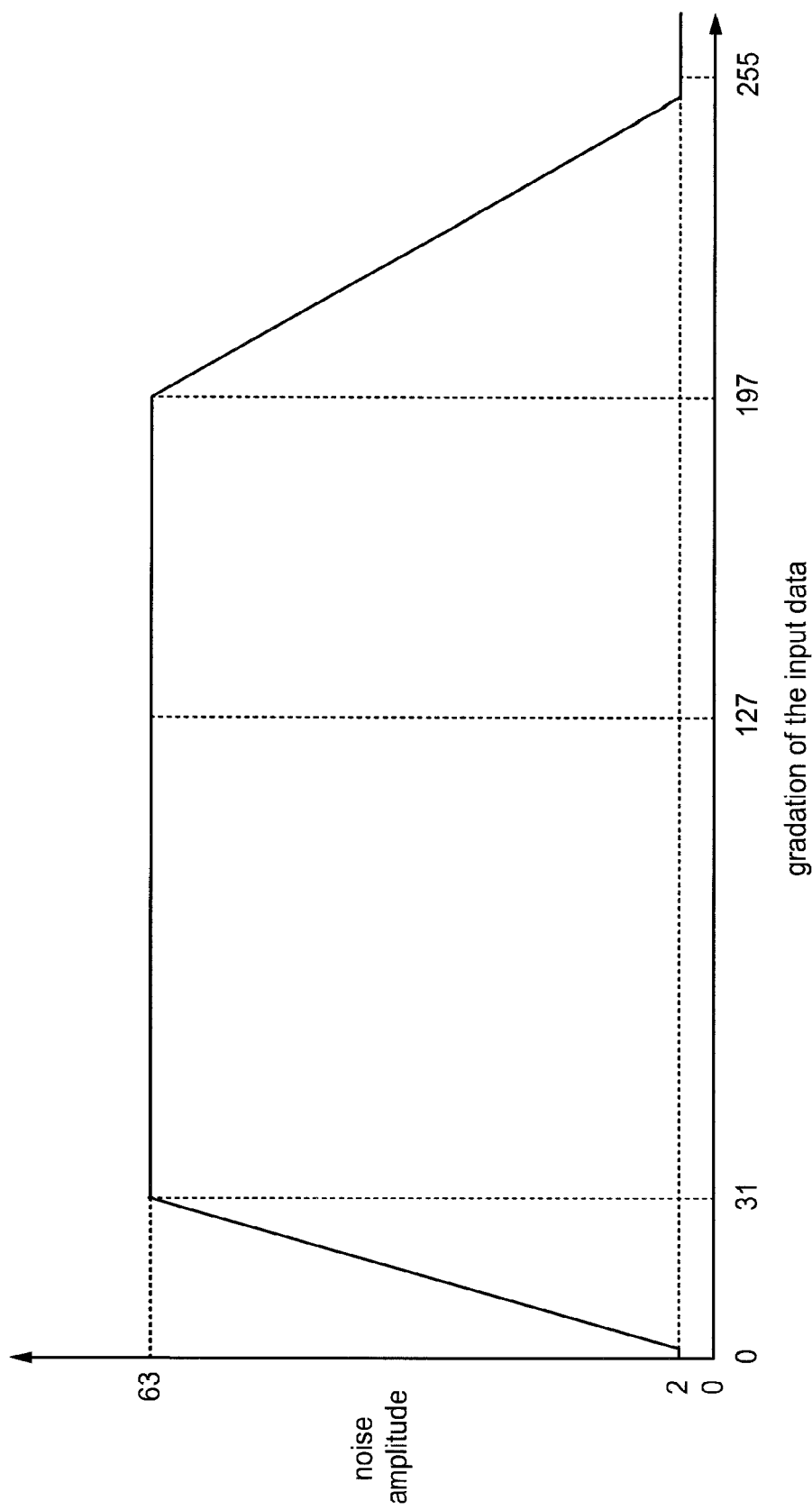
FIG. 14 is a schematic diagram showing yet another example of a relationship between the gradation of input data and noise amplitude related to one embodiment of the present invention.

As is shown in FIG. 14, the noise amplitude adjustment circuit 102 may have data assigned so that the noise amplitude has 2 bits, that is, has an offset of two gradations with respect to each gradation of the input data 100. FIG. 14 is similar to FIG. 6 except for assigning so that the noise amplitude has 2 bits, that is, has an offset of 2 gradations. Therefore, in FIG. 14, an explanation other than having the offset of 2 gradations is omitted. By assigning the noise amplitude to have 2 bits, that is, have an offset of 2 gradations, it is possible to make the noise amplitude less apparent in particular when the input data 100 is low gradation. In addition, by assigning the noise amplitude to have 2 bits, that is, have an offset of 2 gradations, it is possible to make the noise amplitude less apparent in particular when the input data 100 is high gradation.

By providing such a structure, it is possible to assign a noise amplitude with a large value to input data in which a measured flicker is large. Therefore, by performing error diffusion processing, since the error of the image data having a large flicker is dispersed within the image data of the surrounding pixels, it is possible to provide image data with suppressed flickering. Therefore, it is possible to provide an image processing device which can reduce the deterioration in image quality and provide high quality image data.

The embodiments described above as embodiments of the present invention can be implemented in combination as appropriate as long as they do not contradict each other.

The image processing device and the image processing method of the image processing device and the display system in which these are mounted are mainly exemplified as disclosed examples in the present specification. As the display device displaying the image data processed by the image processing device, any flat panel type display device such as another self-light emitting type display device, a liquid crystal display device, an electronic paper type display device having an electrophoretic element or the like may be used. In addition, the present invention can be applied from medium to small size to large size applications without any particular limitation.

Other effects which are different from the effects brought about by the mode of each embodiment described above, and those obvious from the descriptions of the present specification or those that could easily be predicted by a person ordinarily skilled in the art are naturally to be interpreted as being in accordance with the present invention.

What is claimed is:

1. An image processing device comprising:
   a noise output circuit outputting noise data having an adjusted noise amplitude according to a gradation of input data;
   a data synthesis circuit synthesizing noise data output from the noise output circuit and the input data; and
   an error diffusion process circuit configured to perform an error diffusion process on data synthesized and obtained from the data synthesis circuit,
   wherein in range of the gradation of the input data, the noise amplitude includes a first noise amplitude, a second noise amplitude, and a third noise amplitude,
   the first noise amplitude is larger the second noise amplitude and the first noise amplitude is larger than the third noise amplitude,
   the first noise amplitude is noise amplitude with respect to a median value of the gradation,
   the second noise amplitude is a noise amplitude with respect to a first gradation smaller than the median value, and
   the third noise amplitude is a noise amplitude with respect to a second gradation larger than the median value.

2. The image processing device according to claim 1, wherein in the range of gradation of the input data, the first noise amplitude is the maximum.

3. The image processing device according to claim 1, wherein the first noise amplitude, the second noise amplitude and the third noise amplitude are larger than noise amplitudes with respect to other gradations.

4. The image processing device according to claim 1, wherein the noise output circuit includes an amplitude adjustment circuit outputting a noise amplitude corresponding to a gradation of the input data, a noise pattern storage circuit having noise pattern data including a certain noise amplitude corresponding to a pixel, and an arithmetic circuit performing a calculation for adjustment based on a noise amplitude output from the amplitude adjustment circuit outputting a noise amplitude of a noise pattern included in the noise pattern storage circuit, wherein the noise amplitude of noise data output by the noise pattern storage circuit is adjusted by the arithmetic circuit to be data corresponding to a pixel.

5. The image processing device according to claim 4, wherein the amplitude adjustment circuit includes a look-up table for stipulating a corresponding relationship between gradation and noise amplitude, and outputs a noise amplitude corresponding to gradation of the input data by referencing the look-up table.

6. The image processing device according to claim 4, wherein the noise pattern data included in the noise pattern storage circuit is fixed data of n bits and n is a natural number of 2 of more.

7. The image processing device according to claim 6, wherein the noise pattern storage circuit has a memory including the fixed data.

8. The image processing device according to claim 6, wherein the fixed data has a dither pattern.

9. The image processing device according to claim 6, wherein the fixed data has a pattern in which 64 levels of noise amplitude is arranged in 8 rows and 8 columns respectively.

10. The image processing device according to claim 1, wherein the data synthesis circuit is arranged with an addition circuit configured to add noise data output from the noise output circuit and the input data, and the synthesis process by the data synthesis circuit includes addition processing by the addition circuit.

11. The image processing device according to claim 1, wherein the data synthesis circuit is arranged with an encoding circuit configured to encode data, and the synthesis process by the data synthesis circuit includes an encoding process by the encoding circuit.

12. The image processing device according to claim 11, wherein the encoding process in the encoding circuit includes a process for converting data with 2 less bits.

13. The image processing device according to claim 1, wherein the range of the input data is 256 levels, and the first gradation has 32 levels and the second gradation had 198 levels.

14. A display system comprising:
a display device including pixels arranged in a first direction and a second direction intersecting the first direction; and
the image processing device according to claim 1 and controlling gradation of the pixels based on data undergoing the error diffusion process.

15. A display system according to claim 14, wherein the pixel includes a plurality of subpixels with different areas, and gradation of the pixel is controlled by the plurality of subpixels.

16. An image processing method comprising:
inputting input data;
outputting noise data having an adjusted noise amplitude corresponding to a gradation of the input data;
synthesizing the output noise data and the input data; and
performing an error diffusion process on the synthesized obtained data,
wherein in range of the gradation of the input data, the noise amplitude includes a first noise amplitude, a second noise amplitude, and a third noise amplitude,
the first noise amplitude is larger the second noise amplitude and the first noise amplitude is larger than the third noise amplitude,
the first noise amplitude is noise amplitude with respect to a median value of the gradation,
the second noise amplitude is a noise amplitude with respect to a first gradation smaller than the median value, and
the third noise amplitude is a noise amplitude with respect to a second gradation larger than the median value.

17. An image processing method according to claim 16, wherein synthesizing the output noise data and the input data includes a process for adding the output noise data and the input data.

18. An image processing method according to claim 16, wherein synthesizing the output noise data and the input data includes a process for converting to data with 2 bits less.

19. An image processing device comprising:
a noise output circuit outputting noise data having an adjusted noise amplitude according to a gradation of input data;
a data synthesis circuit synthesizing noise data output from the noise output circuit and the input data; and
an error diffusion process circuit configured to perform an error diffusion process on data synthesized and obtained from the data synthesis circuit,
wherein the noise output circuit includes an amplitude adjustment circuit outputting a noise amplitude corresponding to a gradation of the input data,
a noise pattern storage circuit having noise pattern data including a certain noise amplitude corresponding to a pixel, and
an arithmetic circuit performing a calculation for adjustment based on a noise amplitude output from the amplitude adjustment circuit outputting a noise amplitude of a noise pattern included in the noise pattern storage circuit,
wherein the noise amplitude of noise data output by the noise pattern storage circuit is adjusted by the arithmetic circuit to be data corresponding to a pixel.

20. The image processing device according to claim 19, wherein in the range of gradation of the input data, the noise amplitude includes a first noise amplitude, a second noise amplitude, and a third noise amplitude,
the first noise amplitude is larger the second noise amplitude and the first noise amplitude is larger than the third noise amplitude,
the first noise amplitude is noise amplitude with respect to a median value of the gradation,
the second noise amplitude is a noise amplitude with respect to a first gradation smaller than the median value,
the third noise amplitude is a noise amplitude with respect to a second gradation larger than the median value, and
the first noise amplitude is the maximum.

21. The image processing device according to claim 19, wherein in range of gradation of the input data, the noise amplitude includes a first noise amplitude, a second noise amplitude, and a third noise amplitude,
the first noise amplitude is larger the second noise amplitude and the first noise amplitude is larger than the third noise amplitude,
the first noise amplitude is noise amplitude with respect to a median value of the gradation,
the second noise amplitude is a noise amplitude with respect to a first gradation smaller than the median value,
the third noise amplitude is a noise amplitude with respect to a second gradation larger than the median value, and
the first noise amplitude, the second noise amplitude and the third noise amplitude are larger than noise amplitudes with respect to other gradations.

22. The image processing device according to claim 19, wherein the data synthesis circuit is arranged with an addition circuit configured to add noise data output from the noise output circuit and the input data, and the synthesis process by the data synthesis circuit includes addition processing by the addition circuit.

23. The image processing device according to claim 19, wherein the data synthesis circuit is arranged with an encoding circuit configured to encode data, and the synthesis process by the data synthesis circuit includes an encoding process by the encoding circuit.

24. The image processing device according to claim 23, wherein the encoding process in the encoding circuit includes a process for converting data with 2 less bits.

25. The image processing device according to claim 19, wherein the amplitude adjustment circuit includes a look-up table for stipulating a corresponding relationship between gradation and noise amplitude, and outputs a noise amplitude corresponding to gradation of the input data by referencing the look-up table.

26. The image processing device according to claim 19, wherein in range of gradation of the input data, the noise amplitude includes a first noise amplitude, a second noise amplitude, and a third noise amplitude,
the first noise amplitude is larger the second noise amplitude and the first noise amplitude is larger than the third noise amplitude,
the first noise amplitude is noise amplitude with respect to a median value of the gradation,
the second noise amplitude is a noise amplitude with respect to a first gradation smaller than the median value,
the third noise amplitude is a noise amplitude with respect to a second gradation larger than the median value, and
the range of the input data is 256 levels, and the first gradation has 32 levels and the second gradation had 198 levels.

27. The image processing device according to claim 19, wherein the noise pattern data included in the noise pattern storage circuit is fixed data of n bits and n is a natural number of 2 of more.

28. The image processing device according to claim 27, wherein the noise pattern storage circuit has a memory including the fixed data.

29. The image processing device according to claim 27, wherein the fixed data has a dither pattern.

30. The image processing device according to claim 27, wherein the fixed data has a pattern in which 64 levels of noise amplitude is arranged in 8 rows and 8 columns respectively.

31. A display system comprising:
a display device including pixels arranged in a first direction and a second direction intersecting the first direction; and
the image processing device according to claim 19 and controlling gradation of the pixels based on data undergoing the error diffusion process.

32. A display system according to claim 31, wherein the pixel includes a plurality of subpixels with different areas, and gradation of the pixel is controlled by the plurality of subpixels.

* * * * *